(12) United States Patent
Nommensen et al.

(10) Patent No.: US 8,132,817 B2
(45) Date of Patent: Mar. 13, 2012

(54) AIR SUSPENSION CONTROL APPARATUS

(75) Inventors: Daniel Nommensen, Monroe, WI (US);
Eric Falsey, Monroe, WI (US)

(73) Assignee: Monroe Truck Equipment Inc., Monroe, WI (US)

( * ) Notice: Subject to any disclaimer, the term of this patent is extended or adjusted under 35 U.S.C. 154(b) by 203 days.

(21) Appl. No.: 12/657,977

(22) Filed: Jan. 29, 2010

(65) Prior Publication Data

US 2010/0237573 A1    Sep. 23, 2010

Related U.S. Application Data

(60) Provisional application No. 61/206,409, filed on Jan. 30, 2009.

(51) Int. Cl.
*B60G 17/04* (2006.01)
(52) U.S. Cl. .................................................. 280/6.151
(58) Field of Classification Search ............... 280/5.514, 280/6.151, 6.152, 6.157, 6.16, 124.158, 124.159
See application file for complete search history.

(56) References Cited

U.S. PATENT DOCUMENTS

| | | | |
|---|---|---|---|
| 5,273,308 A * | 12/1993 | Griffiths | 280/6.151 |
| 7,416,190 B2 * | 8/2008 | Sandbulte et al. | 280/6.151 |
| 7,530,577 B2 * | 5/2009 | Sandbulte et al. | 280/6.151 |
| 7,590,478 B2 * | 9/2009 | Folchert et al. | 701/37 |

* cited by examiner

*Primary Examiner* — Paul N Dickson
*Assistant Examiner* — Robert A Coker
(74) *Attorney, Agent, or Firm* — David J. Archer (57) ABSTRACT

An air suspension control apparatus for a vehicle is disclosed. The apparatus includes a charge tank maintained at a first air pressure such that selective filling of the charge tank with compressed air is permitted. The arrangement is such that, in a first disposition of the tank air valve, the charge tank is maintained at a second air pressure which is less than the first air pressure. When the tank air valve is in a second disposition thereof, the charge tank is maintained at the first air pressure. In a third mode of operation of the air suspension control apparatus, the tank air valve is in the first disposition thereof and a ride height air valve is in the first setting thereof. The arrangement is such that the first pressure within the charge tank rapidly inflates the air spring from the third pressure to the second pressure so that driving of the vehicle is permitted.

10 Claims, 6 Drawing Sheets

AIR SUSPENSION CONTROL APPARATUS

CROSS REFERENCE TO RELATED APPLICATION

The present application is a Complete application filed pursuant to Provisional application U.S. Ser. No. 61/206,409 filed Jan. 30, 2009. All of the disclosure of U.S. Ser. No. 61/206,409 is incorporated herein by reference.

BACKGROUND OF THE INVENTION

1. Field of the Invention

The present invention relates to an air suspension control apparatus.

More specifically, the present invention relates to an air suspension control apparatus for a vehicle such as an ambulance.

2. Background Information

In the event of an accident or medical emergency, it is essential that the patient be loaded into an ambulance as rapidly as possible so that the patient can be transported to the nearest hospital.

When the ambulance arrives at the scene, it is known to lower the ambulance suspension in order to facilitate loading of the patient. After the patient has been loaded into the ambulance, the vehicle suspension is pumped up to the driving level so that the patient can be transported to the hospital. However, a problem currently exists in that it normally takes a conventional system 2.50 minutes to reinflate the vehicle air springs to a safe transportation level. Clearly, this 2.50 minute time lag could prove fatal to a critically injured patient or a patient who is having a heart attack.

The present invention overcomes the aforementioned problem of the 2.50 minute time lag by the provision of a unique arrangement that permits the air springs to be rapidly inflated in as little as 1.5 seconds rather than the current 2.50 minutes.

In the present invention, when an ambulance is going down a road, the pressure in the charge tanks and the air springs is the same and is about 45 psi. When the ambulance is stopped to load or unload a patient, a discharge air signal is sent and the air spring pressure drops until the ambulance is fully lowered. The discharge signal also raises the charge tank air pressure to the full system pressure of about 100 psi. When the discharge air signal is stopped, the now higher air pressure of about 100 psi in the charge tanks rushes into the air springs, rapidly reinflating the air springs and raising the ambulance to its normal driving height in a few seconds, such as 1.50 seconds instead of 2.50 minutes in conventional systems. The charge tanks and the air springs then again go back to the same pressure of about 45 psi.

Therefore, it is a primary feature of the present invention to provide an air suspension control apparatus for a vehicle such as an ambulance that overcomes the problems associated with prior art air control arrangements.

Another feature of the present invention is to provide an air suspension control apparatus for a vehicle such as an ambulance that enables the rapid raising of the suspension after loading or unloading.

Other features and advantages of the present invention will be readily apparent to those skilled in the art by a consideration of the detailed description of a preferred embodiment of the present invention contained herein.

SUMMARY OF THE INVENTION

The present invention relates to an air suspension control apparatus for a vehicle. The apparatus includes a charge tank which is selectively connected to a source of pressurized air maintained at a first air pressure such that selective filling of the charge tank with compressed air is permitted.

A tank air valve is operably disposed between the source of pressurized air and the charge tank. The tank air valve is selectively movable between a first disposition and a second disposition thereof.

A ride height air valve is operably connected to the tank air valve and to the source of pressurized air. The ride height air valve is selectively movable between a first setting and a second setting thereof.

A control device is operably connected to the tank air valve for controlling movement of the tank air valve between the first and the second dispositions thereof. The arrangement is such that, in the first disposition of the tank air valve, the charge tank is maintained at a second air pressure which is less than the first air pressure. When the tank air valve is in the second disposition thereof, the charge tank is maintained at the first air pressure.

The control device is operably connected to the ride height air valve for controlling movement of the ride height air valve between the first and the second settings thereof.

An air spring is operatively connected to the tank air valve and to the ride height air valve. The arrangement is such that, in a first mode of operation of the air suspension control apparatus, the tank air valve is in the first disposition thereof and the ride height air valve is in the first setting thereof. The arrangement is such that the air spring is maintained at the second pressure for supporting and suspending the vehicle when the vehicle is driven. The ride height air valve maintains the air spring and the charge tank at the second air pressure. However, in a second mode of operation of the air suspension control apparatus, the tank air valve is in the second disposition thereof and the ride height air valve is in the second setting thereof. The arrangement is such that the air spring is maintained at a third pressure, the third pressure being lower than the second pressure so that the vehicle is lowered for facilitating loading or unloading a patient into or out of the vehicle while the air pressure within the charge tank is increased from the second air pressure to the first air pressure. In a third mode of operation of the air suspension control apparatus, the tank air valve is restored to the first disposition thereof and the ride height air valve is restored to the first setting thereof. The arrangement is such that the first pressure within the charge tank rapidly inflates the air spring from the third pressure to the second pressure so that driving of the vehicle is permitted. The first setting of the ride height air valve subsequently restores the charge tank to the second pressure.

In a more specific embodiment of the present invention, the source of pressurized air is maintained at a pressure within a range 90 to 200 psi.

Moreover, the tank air valve includes a first spool which defines a first annular chamber and a second annular chamber which is disposed axially spaced relative to the first annular chamber. A housing defines a cavity for the slidable reception therein of the first spool. The arrangement is such that when the tank air valve is disposed in the first disposition thereof, the first annular chamber is in operable communication with a first port defined by the housing and an opening defined by the housing.

When the tank air valve is disposed in the second disposition thereof, the second annular chamber is in operable communication with a second port which is defined by the housing and the opening defined by the housing.

The first port is operably connected to the air spring and the second port is operably connected to the source of pressurized air. The opening is operably connected to the charge tank.

Additionally, the tank air valve includes a biasing device for urging the first spool axially along the cavity so that the tank air valve is in the first disposition thereof for permitting a first flow of air between the charge tank and the air spring through the first annular chamber and the first port.

Furthermore, the housing defines a third port which is operably connected to the control device. The arrangement is such that when pressurized air is operably connected to the third port, such pressurized air enters the cavity for urging the first spool axially along the cavity in opposition to the biasing device to the second disposition of the tank air valve for permitting a second flow of air between the source of pressurized air and the charge tank through the second annular chamber and the second port.

The ride height air valve includes a casing which defines an enclosure, an inlet, an outlet, a passageway, a first pressure regulating discharge and a second pressure regulating discharge.

A further spool is slidably disposed within the enclosure, the further spool defining a first annular groove and a second annular groove disposed axially spaced relative to the first annular groove.

Additionally, a further biasing device is disposed within the enclosure for urging the further spool axially along the enclosure to the first setting of the ride height air valve.

The inlet is operably connected to the source of pressurized air and the outlet is operably connected to the air spring. Also, the passageway is operably connected to the control device. The arrangement is such that, in the first mode of operation, when the ride height air valve is in the first setting thereof, the air spring is operably connected to the first pressure regulating discharge through the first annular groove so that the air spring is maintained at the second pressure during driving of the vehicle.

In the second mode of operation, when the ride height air valve is in the second setting thereof, pressurized air from the third port urges the second spool axially along the enclosure in opposition to the further biasing device so that the inlet is connected to the second pressure regulating discharge through the second annular groove. The arrangement is such that the air spring is maintained at the third pressure so that the vehicle is lowered for facilitating access to the vehicle.

In the third mode of operation, when the ride height air valve is restored to the first setting, the further spool is urged axially along the enclosure by the further biasing device back to the first setting of the ride height air valve such that the inlet is connected to the source of pressurized air. Also, the outlet is operably connected to the charge tank at the first pressure for rapidly inflating the air spring while the inlet is operably connected to the first pressure regulating discharge through the first annular groove for restoring the charge tank to the second pressure so that driving of the vehicle is again permitted.

The control device includes an air conduit having a first and a second end. The first end of the conduit is operably connected to the source of pressurized air. An off/on air valve is operably disposed between the first and second ends of the conduit. The arrangement is such that when the off/on air valve is disposed in an off disposition thereof, the second end of the conduit is disconnected from the source of pressurized air.

However, when the off/on air valve is disposed in an on disposition thereof, the second end of the conduit is operably connected to the source of pressurized air.

The control device functions such that in the first mode of operation, the off/on air valve is disposed in the off disposition so that the second end of the conduit which is disconnected from the source of pressurized air will permit the spool and the further spool to be biased to the first disposition of the tank air valve and the first setting of the ride height air valve for maintaining the air spring at the second pressure for permitting the vehicle to be driven.

In the second mode of operation, the off/on air valve is disposed in the on disposition so that the second end of the conduit which is operably connected to the source of pressurized air will permit the spool and the further spool to be urged to the second disposition of the tank air valve and the second setting of the ride height air valve respectively for maintaining the air spring at the third pressure for permitting the vehicle to be lowered while the charge tank is charged to the first pressure.

In the third mode of operation, the off/on air valve is disposed back in the off disposition so that the second end of the conduit which is disconnected from the source of pressurized air will permit the spool and the further spool to be biased to the first disposition of the tank air valve and the first setting of the ride height air valve respectively for rapidly inflating the air spring to the second pressure by the charge tank for permitting the vehicle to be driven.

Many modifications and variation in the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

Included in such modifications would be the provision of such apparatus according to the present invention to any transit vehicle such as a city transit bus for easy access for passengers or for a truck so that rapid loading and unloading is facilitated.

BRIEF DESCRIPTION OF THE DRAWINGS

Similar reference characters refer to the same parts throughout the various Figures of the drawings.

DETAILED DESCRIPTION OF THE DRAWINGS

Figure 1:
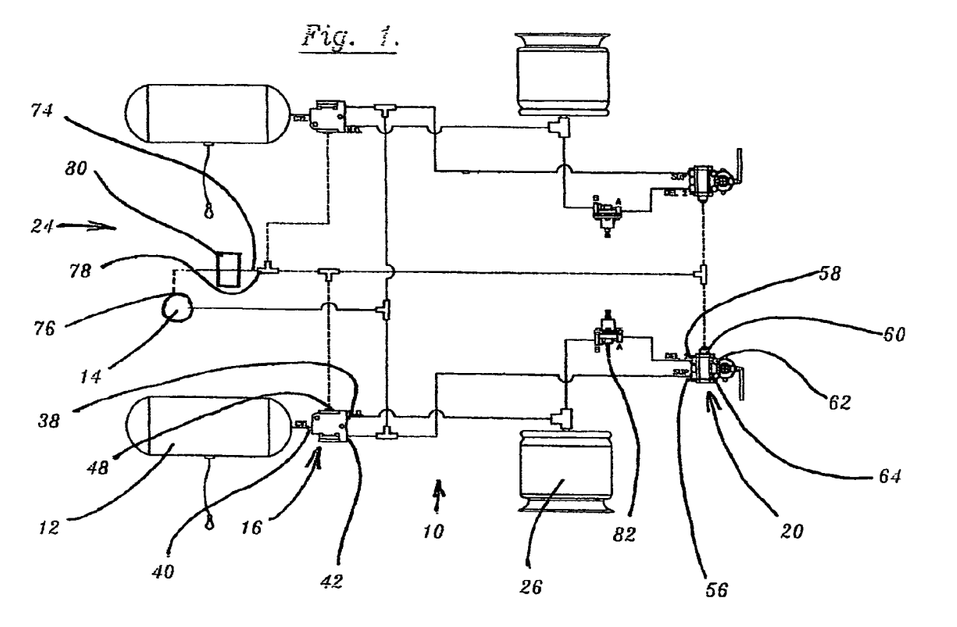
FIG. 1 is a schematic diagram of an air suspension control apparatus according to the present invention for a vehicle such as an ambulance.

FIG. 1 is a schematic diagram of an air suspension control apparatus generally designated 10 for a vehicle such as an ambulance. As shown in FIG. 1, the apparatus 10 includes a charge tank 12 which is selectively connected to a source of pressurized air 14 maintained at a first air pressure P1 such that selective filling of the charge tank 12 with compressed air is permitted. A tank air valve generally designated 16 is operably disposed between the source of pressurized air 14 and the charge tank 12.

Figure 2:
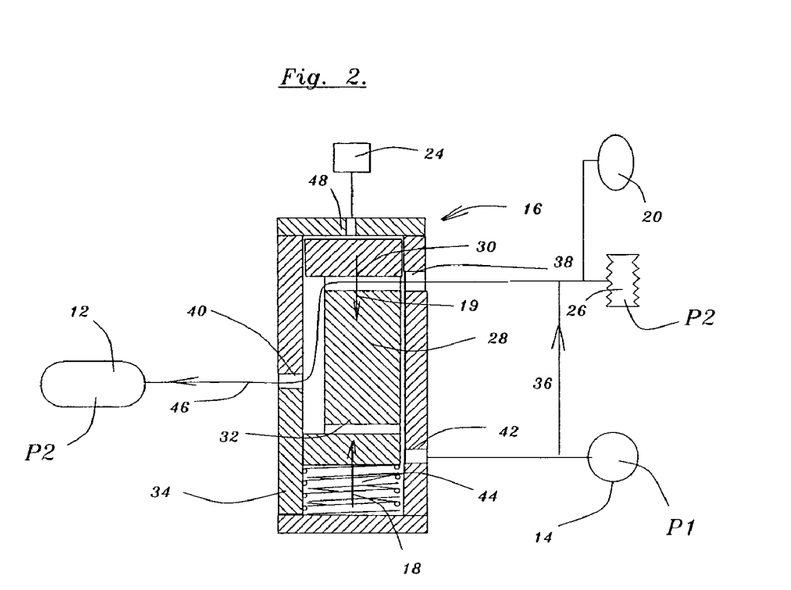
FIG. 2 is an enlarged sectional view of the tank air valve shown in FIG. 1.

FIG. 2 is an enlarged sectional view of the tank air valve 16. As shown in FIG. 2, the tank air valve 16 is selectively movable as indicated by the arrow 18 between a first disposition as shown in FIG. 2 and a second disposition.

Figure 3:
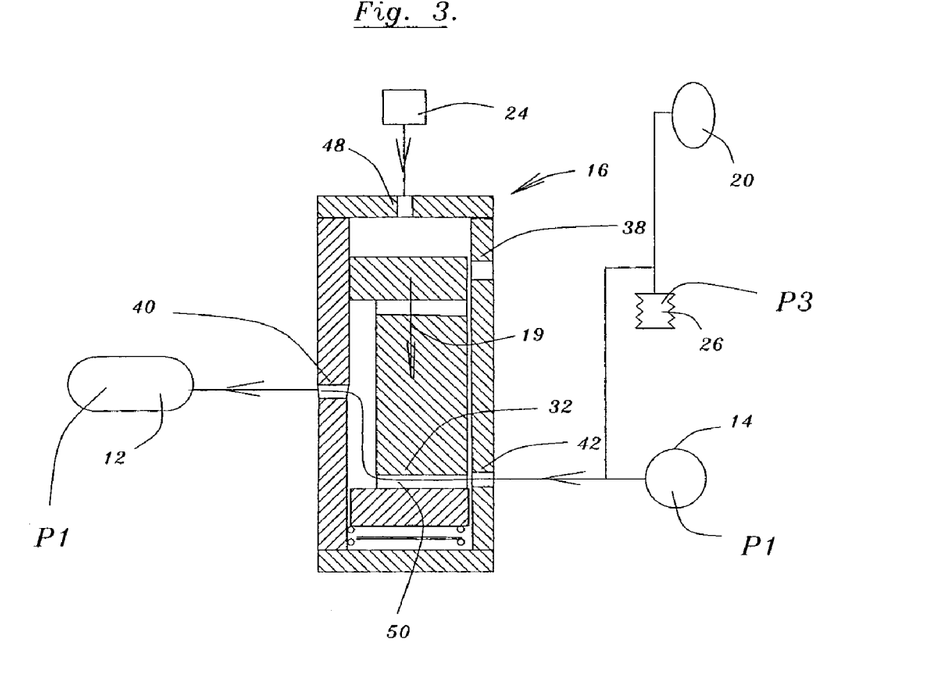
FIG. 3 is an enlarged sectional view of the tank air valve as shown in FIG. 2 but showing the tank air valve in a second disposition thereof.

FIG. 3 is an enlarged sectional view of the tank air valve 16 as shown in FIG. 2 but showing the tank air valve 16 in a second disposition thereof.

Figure 4:
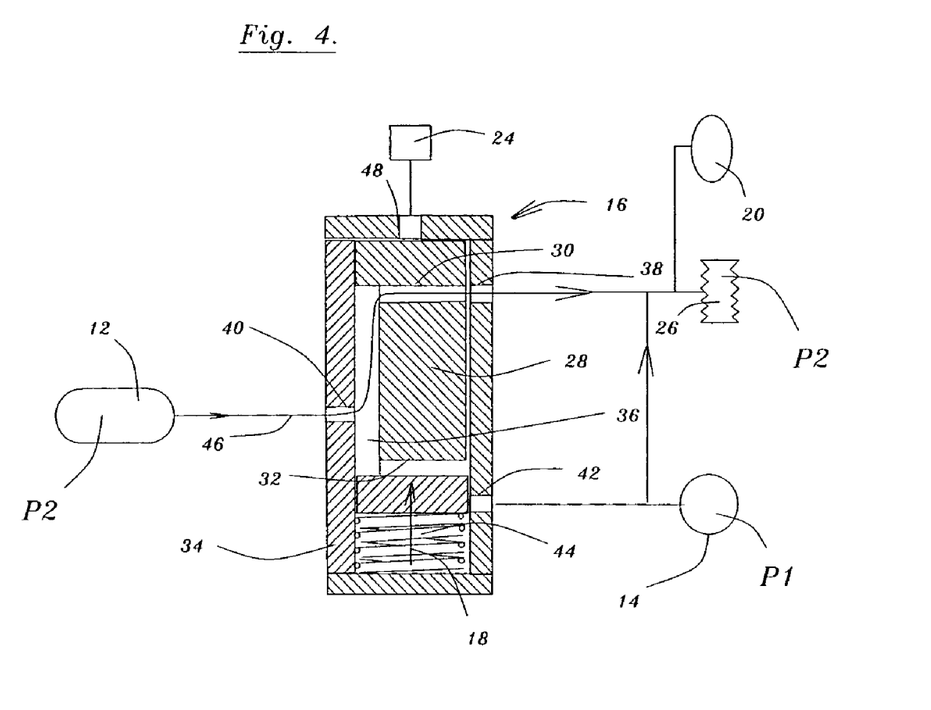
FIG. 4 is a similar view to that shown in FIG. 3 but shows the tank air valve restored to the first disposition thereof.

FIG. 4 is a similar view to that shown in FIG. 3 but shows tank air valve restored to the first disposition thereof.

As shown in FIG. 1, a ride height air valve generally designated 20 is operably connected to the tank air valve 16 and to the source of pressurized air 14.

Figure 5:
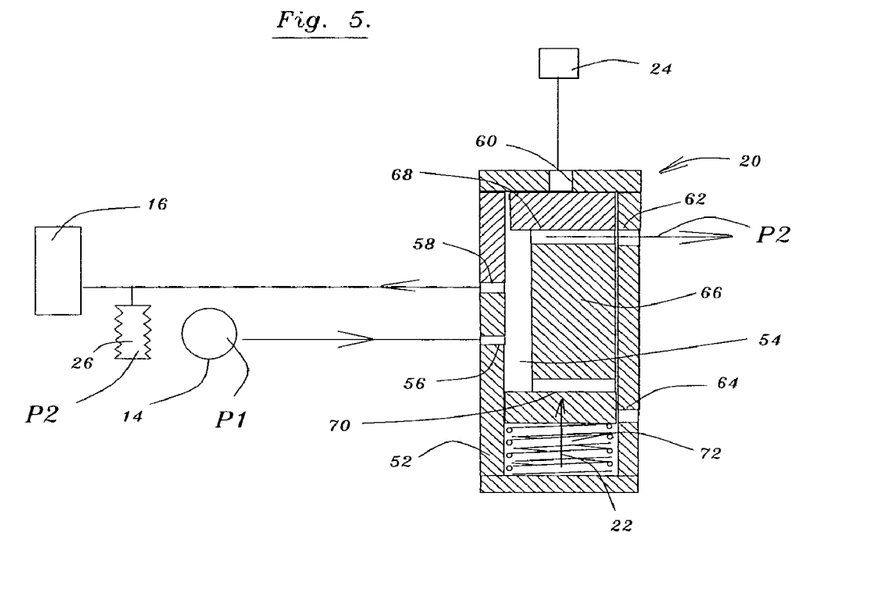
FIG. 5 is an enlarged sectional view of the ride height air valve shown in FIG. 1.

FIG. 5 is an enlarged sectional view of the ride height air valve 20. As shown in FIG. 5, the ride height air valve 20 is selectively movable as indicated by the arrow 22 between a first setting as shown in FIG. 5 and a second setting thereof.

Figure 6:
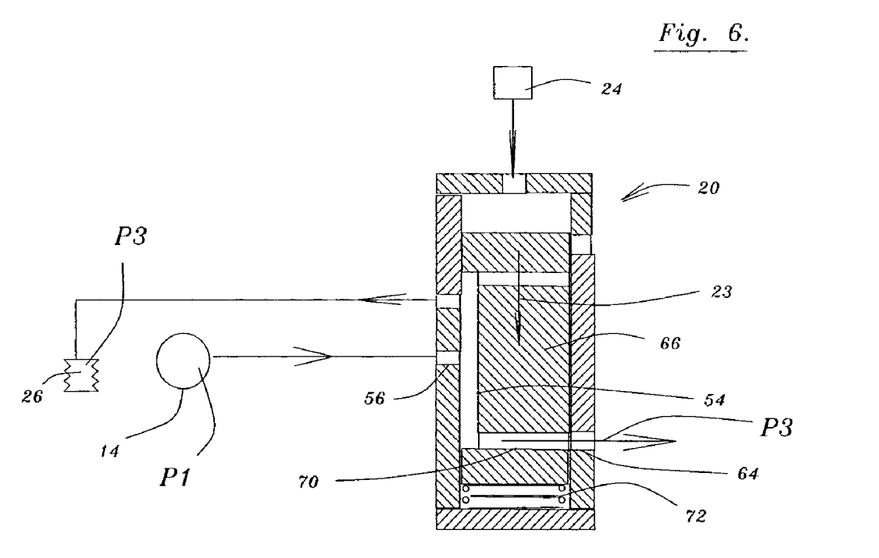
FIG. 6 is an enlarged sectional view of the ride height air valve as shown in FIG. 5 but in the second setting thereof.

FIG. 6 is an enlarged sectional view of the ride height air valve 20 as shown in FIG. 5 but in the second setting thereof.

Figure 7:
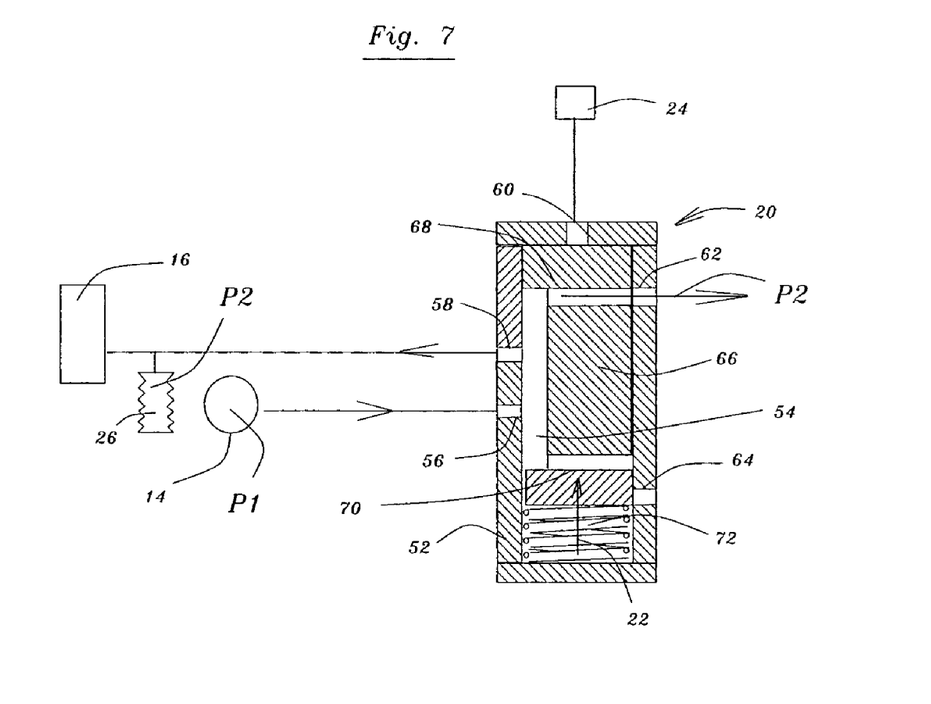
FIG. 7 is a similar view to that shown in FIG. 6 but shows of the ride height air valve restored to the first setting thereof.

FIG. 7 is a similar view to that shown in FIG. 6 but shows of the ride height air valve 20 restored to the first setting thereof.

As shown in FIG. 1, a control device generally designated 24 is operably connected to the tank air valve 16 for controlling movement of the tank air valve 16 between the first and the second dispositions thereof shown in FIGS. 2 and 3 respectively. The arrangement is such that, in the first disposition of the tank air valve 16 as shown in FIG. 2, the charge tank 12 is maintained at a second air pressure P2 which is less than the first air pressure P1. When the tank air valve 16 is in the second disposition thereof as shown in FIG. 3, the charge tank 12 is maintained at the first air pressure P1. The control device 24 is also operably connected to the ride height air valve 20.

FIG. 7 shows the ride height air valve 20 restored to the first setting thereof so that the high pressure P1 in the charge tank 12 rapidly inflates the air spring 26 while the ride height air valve 20 restores the charge tank 12 and the air spring 26 to the second pressure P2.

As shown in FIG. 6, the control device 24 is operably connected to the ride height air valve 20 for controlling movement as indicated by the arrow 22 of the ride height air valve 20 between the first setting as shown in FIG. 5 and the second setting thereof as shown in FIG. 6.

As shown in FIG. 1, the air spring 26 is operatively connected to the tank air valve 16 and to the ride height air valve 20. The arrangement is such that, in a first mode of operation of the air suspension control apparatus 10, the tank air valve 16 is in the first disposition thereof as shown in FIG. 2 and the ride height air valve 20 is in the first setting thereof as shown in FIG. 5 so that the air spring 26 is maintained at the second pressure P2 for supporting and suspending the vehicle when the vehicle is driven. The ride height air valve 20 maintains the air spring 26 and the charge tank 12 at the second air pressure P2. In a second mode of operation of the air suspension control apparatus 10, the tank air valve 16 is in the second disposition thereof as shown in FIG. 3 and the ride height air valve 20 is in the second setting thereof as shown in FIG. 6. The arrangement is such that the air spring 26 is maintained at a third pressure P3, the third pressure P3 being lower than the second pressure P2 so that the vehicle is lowered for facilitating loading and unloading of the vehicle while the air pressure within the charge tank 12 is increased from the second air pressure P2 to the first air pressure P1. In a third mode of operation of the air suspension control apparatus 10 as shown in FIGS. 4 and 7, the tank air valve 16 is restored to the first disposition thereof as shown in FIG. 4 and the ride height air valve 20 is in the first setting thereof as shown in FIG. 7. The arrangement is such that the first pressure P1 within the charge tank 12 as shown in FIG. 3 rapidly inflates the air spring 26 from the third pressure P3 to the second pressure P2 so that driving of the vehicle is permitted. The first setting as shown in FIG. 7 of the ride height air valve 20 subsequently restores the charge tank 12 to the second pressure P2.

In a more specific embodiment of the present invention, the source of pressurized air 14 is maintained at a pressure P1 within a range 90 to 200 psi and preferably 100 psi.

As shown in FIGS. 2 to 4, the tank air valve 16 includes a first spool 28 which defines a first annular chamber 30 and a second annular chamber 32 which is disposed axially spaced relative to the first annular chamber 30. A housing 34 defines a cavity 36 for the slidable reception therein of the first spool 28. The arrangement is such that when the tank air valve 16 is disposed in the first disposition thereof as shown in FIG. 2, the first annular chamber 30 is in operable communication with a first port 38 defined by the housing 34 and an opening 40 defined by the housing 34.

As shown in FIG. 3, when the tank air valve 16 is disposed in the second disposition thereof, the second annular chamber 32 is in operable communication with a second port 42 which is defined by the housing 34 and the opening 40 defined by the housing 34.

FIG. 4 shows the air spring 26 rapidly restored to the second pressure P2.

The first port 38 of the tank air valve 16 as shown in FIG. 2 is operably connected to the air spring 26 and the second port 42 is operably connected to the source of pressurized air 14. The opening 40 is operably connected to the charge tank 12.

Additionally, the tank air valve 16 includes a biasing device 44 for urging the first spool 28 axially along the cavity 36 as indicated by the arrow 18 so that the tank air valve 16 is in the first disposition thereof as shown in FIG. 2 for permitting a first flow of air as indicated by the arrow 46 between the charge tank 12 and the air spring 26 through the first annular chamber 30 and the first port 38.

Furthermore, the housing 34 defines a third port 48 which is operably connected to the control device 24. The arrangement is such that when pressurized air is operably connected to the third port 48, such pressurized air enters the cavity 36 for urging the first spool 28 axially along the cavity 36 as indicated by the arrow 19 in opposition to the biasing device 44 to the second disposition of the tank air valve 16 as shown in FIG. 3 for permitting a second flow of air as indicated by the arrow 50 between the source of pressurized air 14 and the charge tank 12 through the second annular chamber 32 and the second port 42.

As shown in FIGS. 5 to 7, the ride height air valve 20 includes a casing 52 which defines an enclosure 54, an inlet 56, an outlet 58, a passageway 60, a first pressure regulating discharge 62 and a second pressure regulating discharge 64.

A further spool 66 is slidably disposed within the enclosure 54, the further spool 66 defining a first annular groove 68 and a second annular groove 70 disposed axially spaced relative to the first annular groove 68.

Additionally, a further biasing device 72 is disposed within the enclosure 54 for urging the further spool 66 axially along the enclosure 54 as indicated by the arrow 22 to the first setting of the ride height air valve 20 as shown in FIG. 5.

The inlet 56 is operably connected to the source of pressurized air 14 and the outlet 58 is operably connected to the air spring 26. Also, the passageway 60 is operably connected to the control device 24. The arrangement is such that, in the first mode of operation, when the ride height air valve 20 is in the first setting thereof as shown in FIG. 5, the air spring 26 is operably connected to the first pressure regulating discharge 62 which is preset to discharge when the second pressure P2 is attained so that the second pressure P2 is maintained. The first pressure regulating discharge 62 is connected through the first annular groove 68 so that the air spring 26 is maintained at the second pressure P2 during driving of the vehicle.

In the second mode of operation, when the ride height air valve 20 is in the second setting thereof as shown in FIG. 6, pressurized air from the control device 24 urges the second spool 66 axially along the enclosure 54 in opposition to the further biasing device 72 as indicated by arrow 23 so that the inlet 56 is connected to the second pressure regulating discharge 64 which is preset to discharge when the third pressure P3 is attained so that the third pressure P3 is maintained. The inlet 56 is connected to the second pressure regulating discharge 64 through the second annular groove 70. The arrangement is such that the air spring 26 is maintained at the low third pressure P3 so that the vehicle is lowered for facilitating loading and unloading of the vehicle.

In the third mode of operation as shown in FIGS. 4 and 7, when the ride height air valve 20 is restored to the first setting as shown in FIG. 7, the second spool 66 is urged axially along the enclosure 54 by the further biasing device 72 back to the first setting of the ride height air valve 20 such that the inlet 56 is connected to the source of pressurized air 14. Also, the outlet 58 is operably connected to the charge tank 12 at the first pressure P1 for rapidly inflating the air spring 26 while the inlet 56 is operably connected to the first pressure regulating discharge 62 through the first annular groove 68 for restoring the charge tank 12 to the second pressure P2 so that driving of the vehicle is again permitted.

Figure 8:
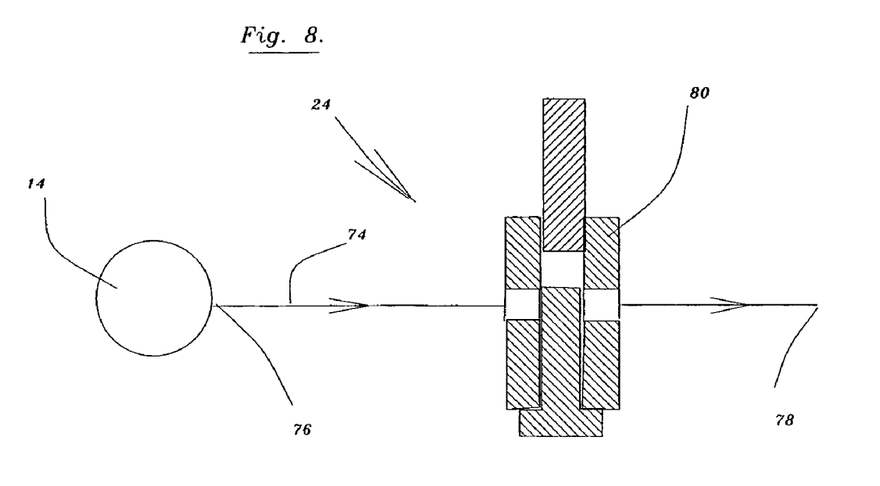
FIG. 8 is an enlarged sectional view of the off/on air valve shown in FIG. 1.

FIG. 8 is an enlarged sectional view of the off/on air valve 80 shown in FIG. 1. As shown in FIG. 8, the control device 24 includes an air conduit 74 having a first and a second end 76 and 78 respectively. The first end 76 of the conduit 74 is operably connected to the source of pressurized air 14. The off/on air valve 80 is operably disposed between the first and second ends 76 and 78 of the conduit 74.

The arrangement is such that when the off/on air valve is disposed in an off disposition thereof as shown in FIG. 8, the second end 78 of the conduit 74 is disconnected from the source of pressurized air 14.

Figure 9:
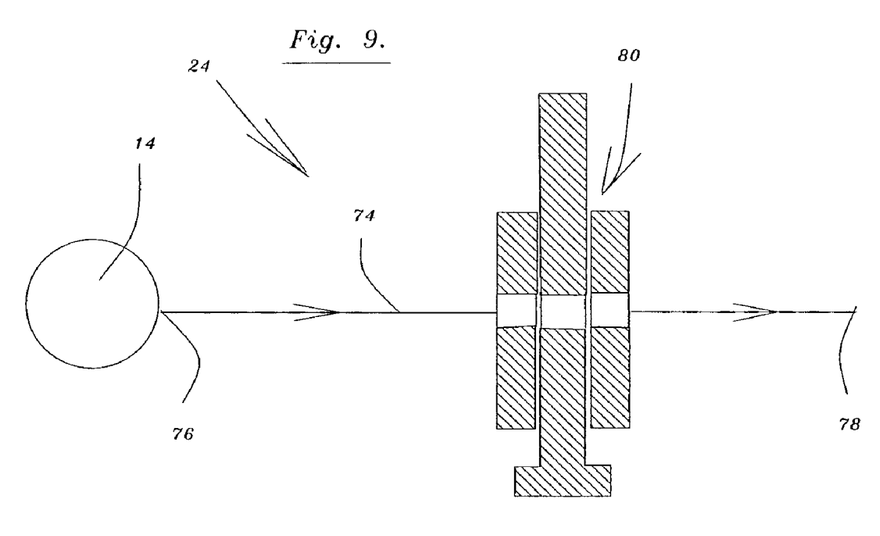
FIG. 9 is an enlarged sectional view of the off/on air valve as shown in FIG. 8 but with the off/on air valve disposed in an on disposition thereof.

FIG. 9 is an enlarged sectional view of the off/on air valve 80 as shown in FIG. 8 but with the off/on air valve disposed in an on disposition thereof. As shown in FIG. 9, when the off/on air valve is disposed in the on disposition thereof, the second end 78 of the conduit 74 is operably connected to the source of pressurized air 14.

The control device 24 functions such that in the first mode of operation as shown in FIGS. 2, 5 and 8, the off/on air valve is disposed in the off disposition as shown in FIG. 8 so that the second end 78 of the conduit 74 which is disconnected from the source of pressurized air 14 will permit the first spool 28 and the second spool 66 to be biased to the first disposition of the tank air valve 16 and the first setting of the ride height air valve 20 respectively as shown in FIGS. 2 and 5, for maintaining the air spring 26 at the second pressure P2 for permitting the vehicle to be driven.

In the second mode of operation as shown in FIGS. 3, 6 and 9, the off/on air valve 80 is disposed in the on disposition as shown in FIG. 9 so that the second end 78 of the conduit 74 which is operably connected to the source of pressurized air 14 will permit the first spool 28 and the second spool 66 to be urged to the second disposition of the tank air valve 16 and the second setting of the ride height air valve 20 respectively as shown in FIGS. 3 and 6, for maintaining the air spring 26 at the third pressure P3 for permitting the vehicle to be lowered while the charge tank 12 is charged to the first pressure P1.

In the third mode of operation as shown in FIGS. 4, 7 and 8, the off/on air valve 80 is restored to the off disposition as shown in FIG. 8 so that the second end 78 of the conduit 74 which is disconnected from the source of pressurized air 14 will permit the first spool 28 and the second spool 66 to be biased back to the first disposition of the tank air valve 16 and the first setting of the ride height air valve 20 respectively as shown in FIGS. 4 and 7, for rapidly inflating the air spring 26 to the second pressure P2 by the charge tank 12 for permitting the vehicle to be driven.

Figure 10:
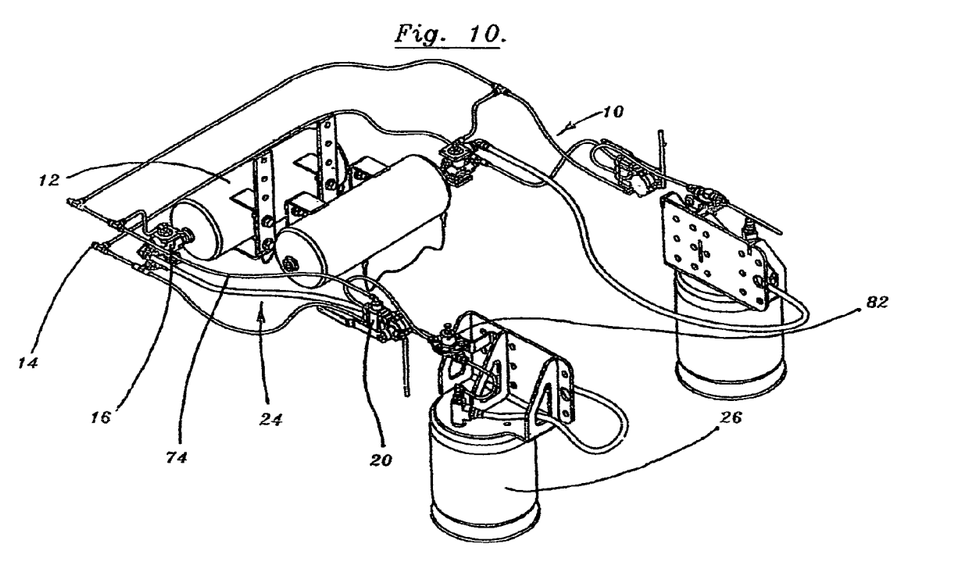
FIG. 10 is a perspective view of the air suspension control apparatus shown in FIGS. 1-9.

FIG. 10 is a perspective view of the air suspension control apparatus shown in FIGS. 1-9.

Those skilled in the art will appreciate that although in the detailed description of the drawings, the control device 24 is described and shown as being supplied with pressurized air from the source of pressurized air 14, the control device 24 could be supplied from another source of pressurized air at a different pressure than P1. Alternatively, the control device 24 could be a hydraulic circuit or an electromagnetic circuit or even a mechanical lever system for moving the spools 28 and 66 between their first and second dispositions and settings respectively.

Additionally, although the detailed description makes reference to a charge tank 12, a tank air valve 16, a ride height air valve 20 and an air spring 26, the present invention includes the arrangement as shown in both FIGS. 1 and 10 where the aforementioned elements are duplicated for adjustably supporting both sides of the vehicle.

Also, in a preferred embodiment of the present invention, the pressure P1 is 100 psi, the second pressure P2 is 45 psi and the third pressure P3 is 15 psi.

Furthermore, as shown in FIGS. 1 and 10, the air suspension control apparatus 10 also includes an adjustable pressure protection valve 82.

In operation of the apparatus 10, as shown in FIGS. 1-10, in the first mode of operation, when the ride height air valve 20 is in the first setting thereof as shown in FIG. 5, the air spring 26 is operably connected to the first pressure regulating discharge 62 which is preset to discharge when the second pressure P2 of 45 psi is attained so that the second pressure P2 of 45 psi is maintained. The first pressure regulating discharge 62 is connected through the first annular groove 68 so that the air spring 26 is maintained at the second pressure P2 of 45 psi during driving of the vehicle.

In the second mode of operation, when the ride height air valve 20 is in the second setting thereof as shown in FIG. 6, pressurized air from the control device 24 at 100 psi urges the second spool 66 axially along the enclosure 54 in opposition to the further biasing device 72 as indicated by arrow 23 so that the inlet 56 is connected to the second pressure regulating discharge 64 which is preset to discharge when the third pressure P3 of 15 psi is attained so that the third pressure P3 of 15 psi is maintained. The inlet 56 is connected to the second pressure regulating discharge 64 at 15 psi through the second annular groove 70. The arrangement is such that the air spring 26 is maintained at the third pressure P3 of 15 psi so that the vehicle is lowered for facilitating loading and unloading of the vehicle.

In the third mode of operation as shown in FIGS. 4 and 7, when the ride height air valve 20 is in the first setting as shown in FIG. 7, the second spool 66 is urged axially along the enclosure 54 by the further biasing device 72 back to the first setting of the ride height air valve 20 such that the inlet 56 is connected to the source of pressurized air 14 at 100 psi. Also, the outlet 58 is operably connected to the charge tank 12 at the first pressure P1 at 100 psi for rapidly reinflating the air spring 26 while the inlet 56 is operably connected to the first pressure regulating discharge 62 set at 45 psi through the first annular groove 68 for restoring the charge tank 12 to the second pressure P2 of 45 psi so that driving of the vehicle is again permitted.

The present invention provides a unique arrangement for rapidly reinflating an air spring of an ambulance after loading a patient thus potentially saving a patient's life and for rapidly restoring the ambulance to service after the unloading of the patient at a hospital.

What is claimed is:

1. An air suspension control apparatus for a vehicle, said apparatus comprising:
   a charge tank selectively connected to a source of pressurized air maintained at a first air pressure such that selective filling of said charge tank with compressed air is permitted;
   a tank air valve operably disposed between said source of pressurized air and said charge tank, said tank air valve being selectively movable between a first disposition and a second disposition thereof;
   a ride height air valve operably connected to said tank air valve and to said source of pressurized air, said ride height air valve being selectively movable between a first setting and a second setting thereof;
   a control device operably connected to said tank air valve for controlling movement of said tank air valve between said first and said second dispositions thereof such that in said first disposition of said tank air valve, said charge tank is maintained at a second air pressure which is less than said first air pressure and when said tank air valve is in said second disposition thereof, said charge tank is maintained at said first air pressure, said control device being operably connected to said ride height air valve for controlling movement of said ride height air valve between said first and said second settings thereof; and
   an air spring operatively connected to said tank air valve and to said ride height air valve such that:
   in a first mode of operation of said air suspension control apparatus, said tank air valve is in said first disposition thereof and said ride height air valve is in said first setting thereof so that said air spring is maintained at said second pressure for supporting and suspending the vehicle when the vehicle is driven, said ride height air valve maintaining said air spring and said charge tank at said second air pressure,
   in a second mode of operation of said air suspension control apparatus, said tank air valve is in said second disposition thereof and said ride height air valve is in said second setting thereof such that said air spring is maintained at a third pressure, said third pressure being lower than said second pressure so that the vehicle is lowered for facilitating loading and unloading of said vehicle while said air pressure within said charge tank is increased from said second air pressure to said first air pressure,
   in a third mode of operation of said air suspension control apparatus, said tank air valve is restored to said first disposition thereof and said ride height air valve is restored to said first setting thereof, such that said first pressure within said charge tank rapidly inflates said air spring from said third pressure to said second pressure so that driving of the vehicle is permitted, said first setting of said ride height air valve subsequently restoring said charge tank to said second pressure.

2. An air suspension control apparatus as set forth in claim 1 wherein
   said source of pressurized air is maintained at a pressure within a range 90 to 200 psi.

3. An air suspension control apparatus as set forth in claim 1 wherein
   said tank air valve includes:
   a first spool defining a first annular chamber and a second annular chamber disposed axially spaced relative to said first annular chamber;
   a housing defining a cavity for the slidable reception therein of said first spool such that when said tank air valve is disposed in said first disposition thereof, said first annular chamber is in operable communication with a first port defined by said housing and an opening defined by said housing and when said tank air valve is disposed in said second disposition thereof, said second annular chamber is in operable communication with a second port defined by said housing and said opening defined by said housing.

4. An air suspension control apparatus as set forth in claim 3 wherein
   said first port is operably connected to said air spring;
   said second port is operably connected to said source of pressurized air;
   said opening is operably connected to said charge tank.

5. An air suspension control apparatus as set forth in claim 4 wherein
   said tank air valve includes:
   a biasing device for urging said first spool axially along said cavity so that said tank air valve is in said first disposition thereof for permitting a first flow of air between said charge tank and said air spring through said first annular chamber and said first port;
   said housing defining a third port which is operably connected to said control device such that when pressurized air is operably connected to said third port, such pressurized air enters said cavity for urging said first spool axially along said cavity in opposition to said biasing device to said second disposition of said tank air valve for permitting a second flow of air between said source of pressurized air and said charge tank through said second annular chamber and said second port.

6. An air suspension control apparatus as set forth in claim 1 wherein
   said ride height air valve includes:
   a casing which defines an enclosure, an inlet, an outlet, a passageway, a first pressure regulating discharge and a second pressure regulating discharge;
   a second spool slidably disposed within said enclosure, said second spool defining a first annular groove and a second annular groove disposed axially spaced relative to said first annular groove;

a further biasing device disposed within said enclosure for urging said second spool along said enclosure to said first setting of said ride height tank air valve.

7. An air suspension control apparatus as set forth in claim 6 wherein said inlet is operably connected to said source of pressurized air, said outlet is operably connected to said air spring and said passageway is operably connected to said control device, the arrangement being such that in said first mode of operation, when said ride height air valve is in said first setting thereof, said air spring is operably connected to said first pressure regulating discharge through said first annular groove so that said air spring is maintained at said second pressure during driving of the vehicle and so that in said second mode of operation, when said ride height air valve is in said second setting thereof, pressurized air urges said second spool axially along said enclosure in opposition to said further biasing device so that said inlet is connected to said second pressure regulating discharge through said second annular groove such that said air spring is maintained at said third pressure so that the vehicle is lowered for facilitating access to said vehicle and so that in said third mode of operation, when said ride height air valve is restored to said first setting, said second spool is urged axially along said enclosure by said further biasing device back to said first setting of said ride height air valve such that said inlet is connected to said source of pressurized air and said outlet is operably connected to said charge tank at said first pressure for rapidly inflating said air spring while said inlet is operably connected to said first pressure regulating discharge through said first annular groove for restoring said charge tank to said second pressure so that driving of the vehicle is again permitted.

8. An air suspension control apparatus as set forth in claim 1 wherein said control device includes:

an air conduit having a first and a second end, said first end of said conduit being operably connected to said source of pressurized air;

an off/on air valve operably disposed between said first and second ends of said conduit such that when said off/on air valve is disposed in an off disposition thereof, said second end of said conduit is disconnected from said source of pressurized air and when said off/on air valve is disposed in an on disposition thereof, said second end of said conduit is operably connected to said source of pressurized air;

said control device functioning such that in said first mode of operation, said off/on air valve is disposed in said off disposition so that said second end of said conduit which is disconnected from said source of pressurized air will permit said spool and said further spool to be biased to said first disposition of said tank air valve and said first setting of said ride height air valve for maintaining said air spring at said second pressure for permitting the vehicle to be driven:

in said second mode of operation, said off/on air valve is disposed in said on disposition so that said second end of said conduit which is operably connected to said source of pressurized air will permit said spool and said further spool to be urged to said second disposition of said tank air valve and said second setting of said ride height air valve respectively for maintaining said air spring at said third pressure for permitting the vehicle to be lowered while said charge tank is charged to said first pressure:

in said third mode of operation, said off/on air valve is disposed in said off disposition so that said second end of said conduit which is disconnected from said source of pressurized air will permit said spool and said further spool to be biased to said first disposition of said tank air valve and said first setting of said ride height air valve respectively for rapidly inflating said air spring to said second pressure by said charge tank for permitting the vehicle to be driven.

9. An air suspension control apparatus for a vehicle, said apparatus comprising:

a charge tank selectively connected to a source of pressurized air maintained at a first air pressure such that selective filling of said charge tank with compressed air is permitted;

an tank air valve operably disposed between said source of pressurized air and said charge tank, said tank air valve being selectively movable between a first disposition and a second disposition thereof;

a ride height air valve operably connected to said tank air valve and to said source of pressurized air, said ride height air valve being selectively movable between a first setting and a second setting thereof;

a control device operably connected to said tank air valve for controlling movement of said tank air valve between said first and said second dispositions thereof such that in said first disposition of said tank air valve, said charge tank is maintained at a second air pressure which is less than said first air pressure and when said tank air valve is in said second disposition thereof, said charge tank is maintained at said first air pressure, said control device being operably connected to said ride height air valve for controlling movement of said ride height air valve between said first and said second settings thereof;

an air spring operatively connected to said tank air valve and to said ride height air valve such that in a first mode of operation of said air suspension control apparatus, said tank air valve is in said first disposition thereof and said ride height air valve is in said first setting thereof so that said air spring is maintained at said second pressure for supporting and suspending the vehicle when the vehicle is driven, said ride height air valve maintaining said air spring and said charge tank at said second air pressure, in a second mode of operation of said air suspension control apparatus, said tank air valve is in said second disposition thereof and said ride height air valve is in said second setting thereof such that said air spring is maintained at a third pressure, said third pressure being lower than said second pressure so that the vehicle is lowered for facilitating access to said vehicle while said air pressure within said charge tank is increased from said second air pressure to said first air pressure, in a third mode of operation of said air suspension control apparatus, said tank air valve is in said first disposition thereof and said ride height air valve is in said first setting thereof, such that said first pressure within said charge tank rapidly inflates said air spring from said third pressure to said second pressure so that driving of the vehicle is permitted, said first setting of said ride height air valve subsequently restoring said charge tank to said second pressure;

said control device including:

an air conduit having a first and a second end, said first end of said conduit being operably connected to said source of pressurized air;

an off/on air valve operably disposed between said first and second ends of said conduit such that when said off/on air valve is disposed in an off disposition thereof, said second end of said conduit is disconnected from said source of pressurized air and when said off/on air valve is disposed in an on disposition thereof, said second end of said conduit is operably connected to said source of pressurized air; and said control device functioning such that:

in said first mode of operation, said off/on air valve is disposed in said off disposition so that said second end of said conduit which is disconnected from said source of pressurized air will permit said spool and said further spool to be biased to said first disposition of said tank air valve and said first setting of said ride height air valve for maintaining said air spring at said second pressure for permitting the vehicle to be driven:

in said second mode of operation, said off/on air valve is disposed in said on disposition so that said second end of said conduit which is operably connected to said source of pressurized air will permit said spool and said further spool to be urged to said second disposition of said tank air valve and said second setting of said ride height air valve respectively for maintaining said air spring at said third pressure for permitting the vehicle to be lowered while said charge tank is charged to said first pressure;

in said third mode of operation, said off/on air valve is disposed in said off disposition so that said second end of said conduit which is disconnected from said source of pressurized air will permit said spool and said further spool to be biased to said first disposition of said tank air valve and said first setting of said ride height air valve respectively for rapidly inflating said air spring to said second pressure by said charge tank for permitting the vehicle to be driven.

10. An air suspension control apparatus for a vehicle, said apparatus comprising:

a charge tank selectively connected to a source of pressurized air maintained at a first air pressure such that selective filling of said charge tank with compressed air is permitted;

a tank air valve operably disposed between said source of pressurized air and said charge tank, said tank air valve being selectively movable between a first disposition and a second disposition thereof;

a ride height air valve operably connected to said tank air valve and to said source of pressurized air, said ride height air valve being selectively movable between a first setting and a second setting thereof;

a control device operably connected to said tank air valve for controlling movement of said tank air valve between said first and said second dispositions thereof such that in said first disposition of said tank air valve, said charge tank is maintained at a second air pressure which is less than said first air pressure and when said tank air valve is in said second disposition thereof, said charge tank is maintained at said first air pressure, said control device being operably connected to said ride height air valve for controlling movement of said ride height air valve between said first and said second settings thereof;

an air spring operatively connected to said tank air valve and to said ride height air valve such that in a first mode of operation of said air suspension control apparatus, said tank air valve is in said first disposition thereof and said ride height air valve is in said first setting thereof so that said air spring is maintained at said second pressure for supporting and suspending the vehicle when the vehicle is driven, said ride height air valve maintaining said air spring and said charge tank at said second air pressure, in a second mode of operation of said air suspension control apparatus, said tank air valve is in said second disposition thereof and said ride height air valve is in said second setting thereof such that said air spring is maintained at a third pressure, said third pressure being lower than said second pressure so that the vehicle is lowered for facilitating access to said vehicle while said air pressure within said charge tank is increased from said second air pressure to said first air pressure, in a third mode of operation of said air suspension control apparatus, said tank air valve is in said first disposition thereof and said ride height air valve is in said first setting thereof, such that said first pressure within said charge tank rapidly inflates said air spring from said third pressure to said second pressure so that driving of the vehicle is permitted, said first setting of said ride height air valve subsequently restoring said charge tank to said second pressure;

said source of pressurized air is maintained at a pressure within a range 90 to 200 psi;

said tank air valve includes:

a first spool defining a first annular chamber and a second annular chamber disposed axially relative to said first annular chamber;

a housing defining a cavity for the slidable reception therein of said first spool such that when said tank air valve is disposed in said first disposition thereof, said first annular chamber is in operable communication with a first port defined by said housing and an opening defined by said housing and when said tank air valve is disposed in said second disposition thereof, said second annular chamber is in operable communication with a second port defined by said housing and said opening defined by said housing;

said first port is operably connected to said air spring;

said second port is operably connected to said source of pressurized air;

said opening is operably connected to said charge tank;

said tank air valve includes:

a biasing device for urging said first spool axially along said cavity so that said tank air valve is in said first disposition thereof for permitting a first flow of air between said charge tank and said air spring through said first annular chamber and said first port;

said housing defining a third port which is operably connected to said control device, such that when pressurized air is operably connected to said third port, such pressurized air enters said cavity for urging said first spool axially along said cavity in opposition to said biasing device to said second disposition of said tank air valve for permitting a second flow of air between said source of pressurized air and said charge tank through said second annular chamber and said second port;

said ride height air valve includes:

a casing which defines an enclosure, an inlet, an outlet, a passageway, a first pressure regulating discharge and a second pressure regulating discharge;

a further spool slidably disposed within said enclosure, said further spool defining a first annular groove and a second annular groove disposed axially spaced relative to said first annular groove;

a further biasing device disposed within said enclosure for urging said further spool along said enclosure to said first setting of said ride height tank air valve;

said inlet is operably connected to said source of pressurized air, said outlet is operably connected to said air spring and said passageway is operably connected to said control device, the arrangement being such that, in said first mode of operation, when said ride height air valve is in said first setting thereof, said air spring is operably connected to said first pressure regulating discharge through said first annular groove so that said air spring is maintained at said second pressure during driving of the vehicle and so that, in said second mode of operation, when said ride height air valve is in said second setting thereof, pressurized air urges said second spool axially along said enclosure in opposition to said further biasing device so that said inlet is connected to said second pressure regulating discharge through said second annular groove such that said air spring is maintained at said third pressure so that the vehicle is lowered for facilitating access to said vehicle and so that in said third mode of operation, when said ride height air valve is in said first setting, said further spool is urged axially along said enclosure by said further biasing device back to said first setting of said ride height air valve such that said inlet is connected to said source of pressurized air and said outlet is operably connected to said charge tank at said first pressure for rapidly inflating said air spring while said inlet is operably connected to said first pressure regulating discharge through said first annular groove for restoring said charge tank to said second pressure so that driving of the vehicle is again permitted;

said control device includes:

an air conduit having a first and a second end, said first end of said conduit being operably connected to said source of pressurized air;

an off/on air valve operably disposed between said first and second ends of said conduit such that when said off/on air valve is disposed in an off disposition thereof, said second end of said conduit is disconnected from said source of pressurized air and when said off/on air valve is disposed in an on disposition thereof, said second end of said conduit is operably connected to said source of pressurized air; and said control device functioning such that:

in said first mode of operation, said off/on air valve is disposed in said off disposition so that said second end of said conduit which is disconnected from said source of pressurized air will permit said spool and said further spool to be biased to said first disposition of said tank air valve and said first setting of said ride height air valve for maintaining said air spring at said second pressure for permitting the vehicle to be driven:

in said second mode of operation, said off/on air valve is disposed in said on disposition so that said second end of said conduit which is operably connected to said source of pressurized air will permit said spool and said further spool to be urged to said second disposition of said tank air valve and said second setting of said ride height air valve respectively for maintaining said air spring at said third pressure for permitting the vehicle to be lowered while said charge tank is charged to said first pressure:

in said third mode of operation, said off/on air valve is disposed in said off disposition so that said second end of said conduit which is disconnected from said source of pressurized air will permit said spool and said further spool to be biased to said first disposition of said tank air valve and said first setting of said ride height air valve respectively for rapidly inflating said air spring to said second pressure by said charge tank for permitting the vehicle to be driven.

* * * * *